(12) United States Patent
Manabe

(10) Patent No.: US 10,194,054 B2
(45) Date of Patent: Jan. 29, 2019

(54) IMAGE PROCESSING APPARATUS, IMAGE PROCESSING METHOD, AND STORAGE MEDIUM

(71) Applicant: CANON KABUSHIKI KAISHA, Tokyo (JP)

(72) Inventor: Yoshihiro Manabe, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/685,541

(22) Filed: Aug. 24, 2017

(65) Prior Publication Data

US 2018/0063379 A1 Mar. 1, 2018

(30) Foreign Application Priority Data

Aug. 31, 2016 (JP) .................................. 2016-169375
May 18, 2017 (JP) .................................. 2017-099068

(51) Int. Cl.
*H04N 1/58* (2006.01)
*G06T 11/00* (2006.01)
*H04N 1/60* (2006.01)

(52) U.S. Cl.
CPC ............. *H04N 1/58* (2013.01); *G06T 11/001* (2013.01); *H04N 1/6055* (2013.01); *H04N 1/6058* (2013.01); *H04N 2201/0082* (2013.01)

(58) Field of Classification Search
CPC ...... G06T 11/001; H04N 1/6058; H04N 1/58; H04N 1/6055; H04N 2201/0082
See application file for complete search history.

(56) References Cited

FOREIGN PATENT DOCUMENTS

JP 2016-117176 A 6/2016

*Primary Examiner* — Christopher D Wait
(74) *Attorney, Agent, or Firm* — Canon U.S.A., Inc. IP Division

(57) ABSTRACT

An image processing apparatus includes a first acquisition unit configured to acquire color data representing a color of a target object for each position thereon, a second acquisition unit configured to acquire shape characteristic data representing characteristics of a shape of the target object for each position thereon, and a determination unit configured to determine a first recording amount of a first recording material and a second recording amount of a second recording material based on the color data, the shape characteristic data, and any one of a measurement result, a function calculated based on the measurement result, and a table generated based on the function. The measurement result is obtained by measuring color and shape characteristics of a plurality of types of patches formed by recording the second recording material on the first recording material recorded on a recording medium.

19 Claims, 10 Drawing Sheets

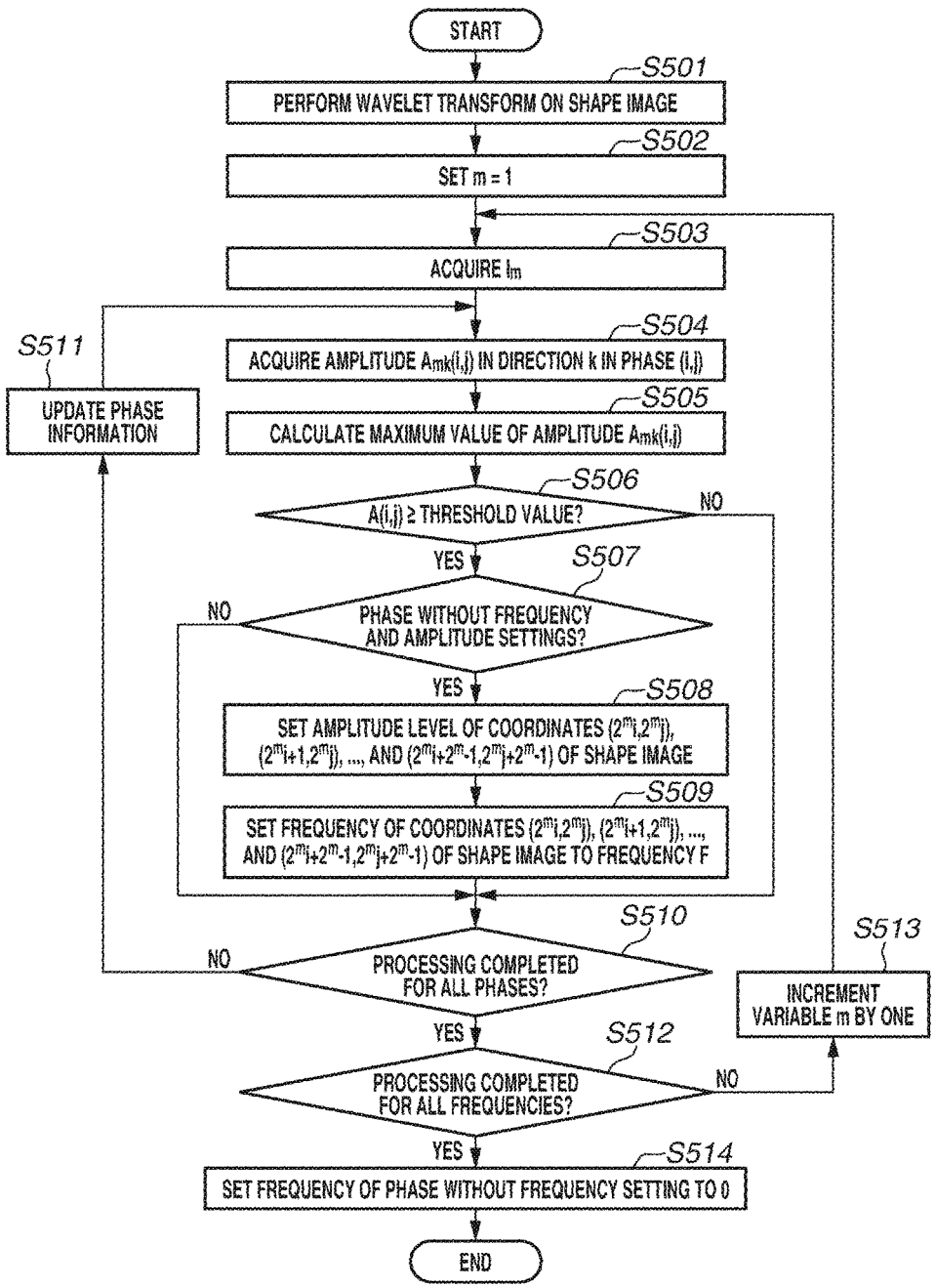

FIG.8

| REPRODUCTION TARGET SHAPE CHARACTERISTICS | | REPRODUCTION TARGET COLOR CHARACTERISTICS | | | SHAPE CHARACTERISTICS OF UNEVEN LAYER | | INK AMOUNT OF COLOR MATERIAL LAYER | | | |
|---|---|---|---|---|---|---|---|---|---|---|
| AMPLITUDE | FREQUENCY | L | a | b | AMPLITUDE | FREQUENCY | C | M | Y | K |
| A1 | F1 | 0 | -128 | -128 | A1' | F1' | xx | xx | xx | xx |
| A1 | F1 | ⋮ | ⋮ | ⋮ | ⋮ | ⋮ | ⋮ | ⋮ | ⋮ | ⋮ |
| A1 | F1 | ⋮ | ⋮ | ⋮ | ⋮ | ⋮ | ⋮ | ⋮ | ⋮ | ⋮ |
| A1 | F1 | Ln | an | bn | An' | Fn' | Cn | Mn | Yn | Kn |
| A1 | F1 | ⋮ | ⋮ | ⋮ | ⋮ | ⋮ | ⋮ | ⋮ | ⋮ | ⋮ |
| A1 | F1 | ⋮ | ⋮ | ⋮ | ⋮ | ⋮ | ⋮ | ⋮ | ⋮ | ⋮ |
| A1 | F1 | ⋮ | ⋮ | ⋮ | ⋮ | ⋮ | ⋮ | ⋮ | ⋮ | ⋮ |
| A1 | F1 | 100 | 128 | 128 | Ax' | Fx' | xx | xx | xx | xx |

IMAGE PROCESSING APPARATUS, IMAGE PROCESSING METHOD, AND STORAGE MEDIUM

BACKGROUND

Field

The present disclosure relates to an image processing technique for forming a color material layer on an arbitrary shape.

Description of the Related Art

In recent years, in the field of replication of art works, there has been not only a demand for reproducing color information of an art work but also a demand for reproducing a surface unevenness of an oil painting or a sculpture, as well as the color of the corresponding portions of the oil painting or the sculpture, at the same time. As one method for forming a surface topography or a solid object, a method using an ink-jet recording process is known. Japanese Patent Application Laid-Open No. 2016-117176 discusses a technique for suitably reproducing a color on an uneven portion by selecting a color gamut used for gamut mapping according to the surface shape of a target object at the corresponding position.

However, in the technique discussed in Japanese Patent Application Laid-Open No. 2016-117176, when forming a color material layer on an uneven layer, in some circumstances, ink may flow on the uneven layer, due to the characteristics of the ink being used for the color material layer and a desired surface shape may not be obtained.

SUMMARY

The present disclosure is directed to processing for achieving reproduction on a recording medium, of a color layer that reflects both a surface topography (e.g., unevenness) as well as a color for each of different portions of a target object.

According to various embodiments of the present disclosure, an image processing apparatus determines a first recording amount of a first recording material for forming a shape of a target object on a recording medium, and a second recording amount of a second recording material for recording a color of the target object on the shape formed on the recording medium. The image processing apparatus includes a first acquisition unit configured to acquire color data representing the color of the target object for each position thereon, a second acquisition unit configured to acquire shape characteristic data representing characteristics of the shape of the target object for each position thereon, and a determination unit configured to determine the first recording amount and the second recording amount based on the color data, the shape characteristic data, and any one of a measurement result, a function calculated based on the measurement result, and a table generated based on the function. The measurement result is obtained by measuring color and shape characteristics of a plurality of types of patches formed by recording the second recording material on the first recording material recorded on the recording medium.

Further features will become apparent from the following description of exemplary embodiments with reference to the attached drawings.

BRIEF DESCRIPTION OF THE DRAWINGS

FIG. 5 is a flowchart illustrating processing for calculating shape characteristics.

FIG. 8 illustrates an example of a lookup table (LUT).

DESCRIPTION OF THE EMBODIMENTS

Figure 1A:
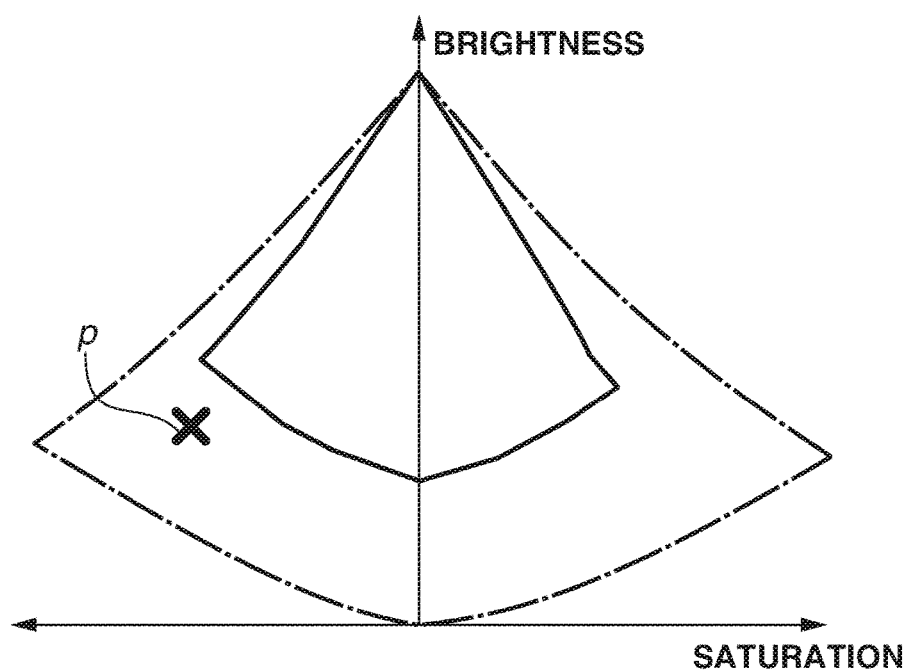
FIGS. 1A, 1B, and 1C are schematic views illustrating change in a color gamut according to an unevenness.
Figure 1B:
Figure 1C:
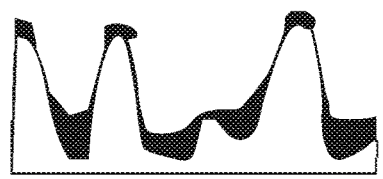

Prior to the description of exemplary embodiments, the dependency of color reproducibility on a difference in unevenness on the surface of an object will be described below with reference to FIGS. 1A, 1B, and 1C. Generally, applying a color material (colored recording material) to a surface with a high-frequency of unevenness reduces the covering rate of the color material leading to degraded coloring property, compared to a case where the color material is applied to a smooth surface. Therefore, the color gamut of a shape containing many high-frequency components has a tendency of becoming smaller in volume than the color gamut of a shape containing many low-frequency components. FIGS. 1A, 1B, and 1C are schematic views illustrating a change in a color reproduction range (hereinafter referred to as a color gamut) according to an unevenness degree of a surface. FIG. 1A illustrates a color gamut with the horizontal axis assigned the saturation and the vertical axis assigned the brightness. FIGS. 1B and 1C are schematic views illustrating results of printing with the same amount of a color material on uneven layers having different shapes or topographies on the surface of the layer, when observed from a sectional direction of a recording medium. A black area refers to a color material layer. As illustrated in FIGS. 1B and 1C, the covering rate of the color material depends on the degree of unevenness of the uneven layer. As illustrated in FIG. 1C, the exposure area of the uneven layer after coloring increases with increasing frequency and amplitude of the unevenness in the uneven layer. Therefore, even in a case where a color gamut drawn by long chain lines illustrated in FIG. 1A is obtained on a smooth surface illustrated in FIG. 1B, the shape illustrated in FIG. 1C reduces the color gamut in the low-brightness portion because of white exposure on the uneven layer. As a result, a color gamut drawn by solid lines illustrated in FIG. 1A is obtained. More specifically, in a surface layer with a high-frequency of unevenness, if an attempt is made to reproduce an identical color on portions of the surface with different degrees of unevenness, the saturation of the color is reduced leading to the reproduction of different colors from that of the intended color.

Additionally, when forming a color material layer on an uneven surface layer, the color material may flow on the uneven surface layer depending on the characteristics of the color material of the color material layer. As a result of such flows, a desired surface shape may not be acquired.

An exemplary embodiment will be described below centering on an example in which both a reproduction of the color and a reproduction of surface topography/unevenness can be achieved by storing information regarding printer outputs corresponding to the reproduction target's shape and color.

An exemplary embodiment of the present disclosure will be described in detail below with reference to the accompanying drawings. The configuration according to the following exemplary embodiment is to be considered as an example, and the present disclosure is not limited to the illustrated configuration.

<Hardware Configuration of Image Processing System>

Figure 2:
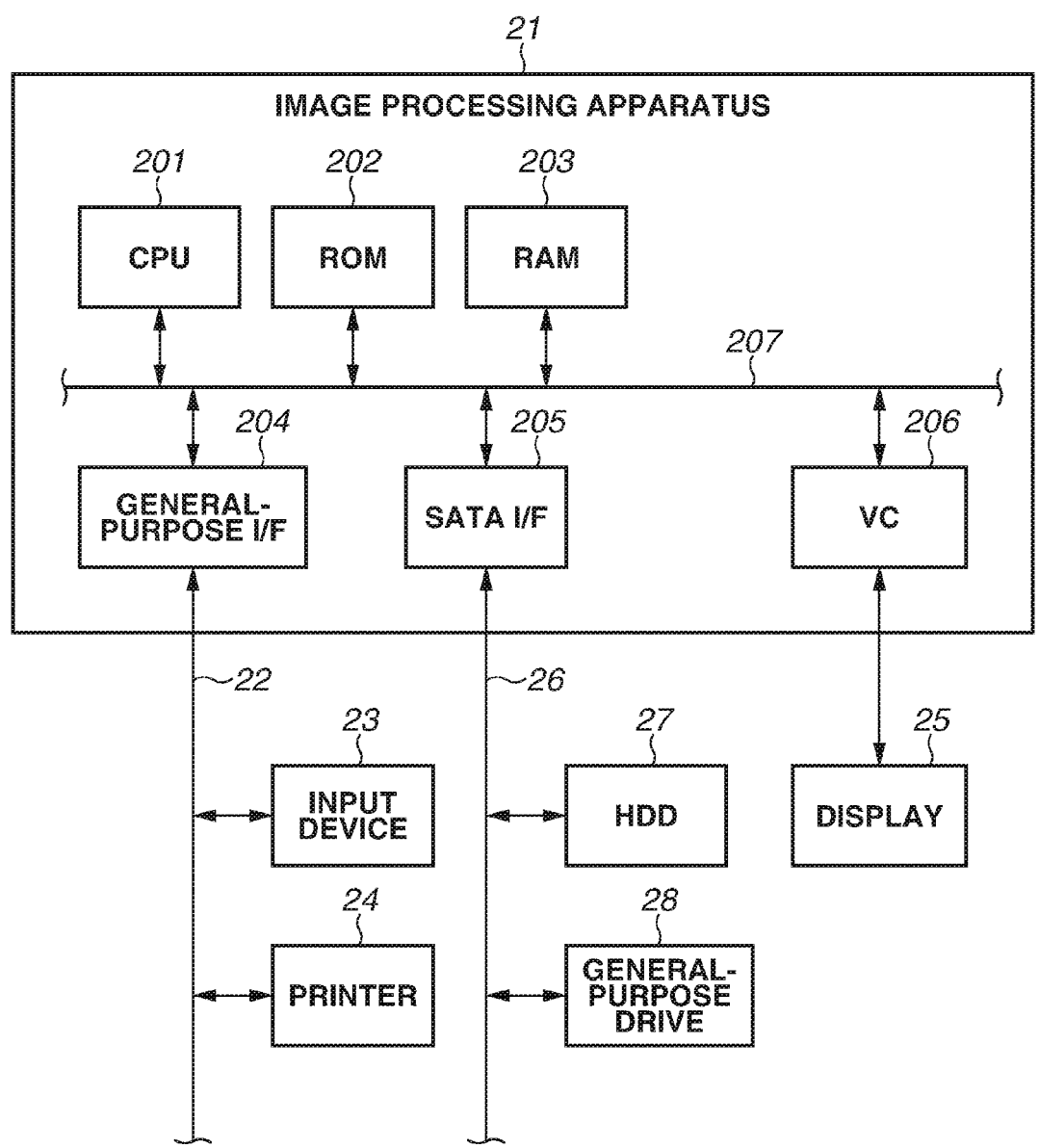
FIG. 2 is a block diagram illustrating an example of a hardware configuration of an image processing system.

FIG. 2 illustrates an example of a hardware configuration of an image processing system including an image processing apparatus 21 according to the present exemplary embodiment. The image processing system includes the image processing apparatus 21, serial buses 22 and 26, an input device 23, a printer 24, a display 25, a hard disk drive (HDD) 27, and a general-purpose drive 28. The image processing apparatus 21 includes a central processing unit (CPU) 201, a read only memory (ROM) 202, a random access memory (RAM) 203, a general-purpose interface (I/F) 204, a serial ATA (SATA) I/F 205, and a video card (VC) 206. The image processing apparatus 21 may be configured to include the image processing system illustrated in FIG. 2.

The CPU 201 executes an operating system (OS) and various programs stored in the ROM 202, the HDD 27, and other various storage media by using the RAM 203 as a work memory to control each component via a system bus 207. Programs executed by the CPU 201 include programs of image processing (described below). The general-purpose I/F 204 is a serial bus interface such as a universal serial bus (USB) interface. The input device 23 such as a mouse or a keyboard, and the printer 24 are connected to the general-purpose I/F 204 via the serial bus 22. The serial ATA (SATA) I/F 205 is connected with the HDD 27 and the general-purpose drive 28 for accessing various storage media via the serial bus 26. The CPU 201 uses the HDD 27 and various storage media mounted on the general-purpose drive 28 as data storage locations. The VC 206 is a video interface connected with the display 25. The CPU 201 displays user interfaces (UIs) provided by programs on the display 25 and receives user inputs including user instructions via the input device 23.

<Functional Configuration of Image Processing System>

Figure 3:
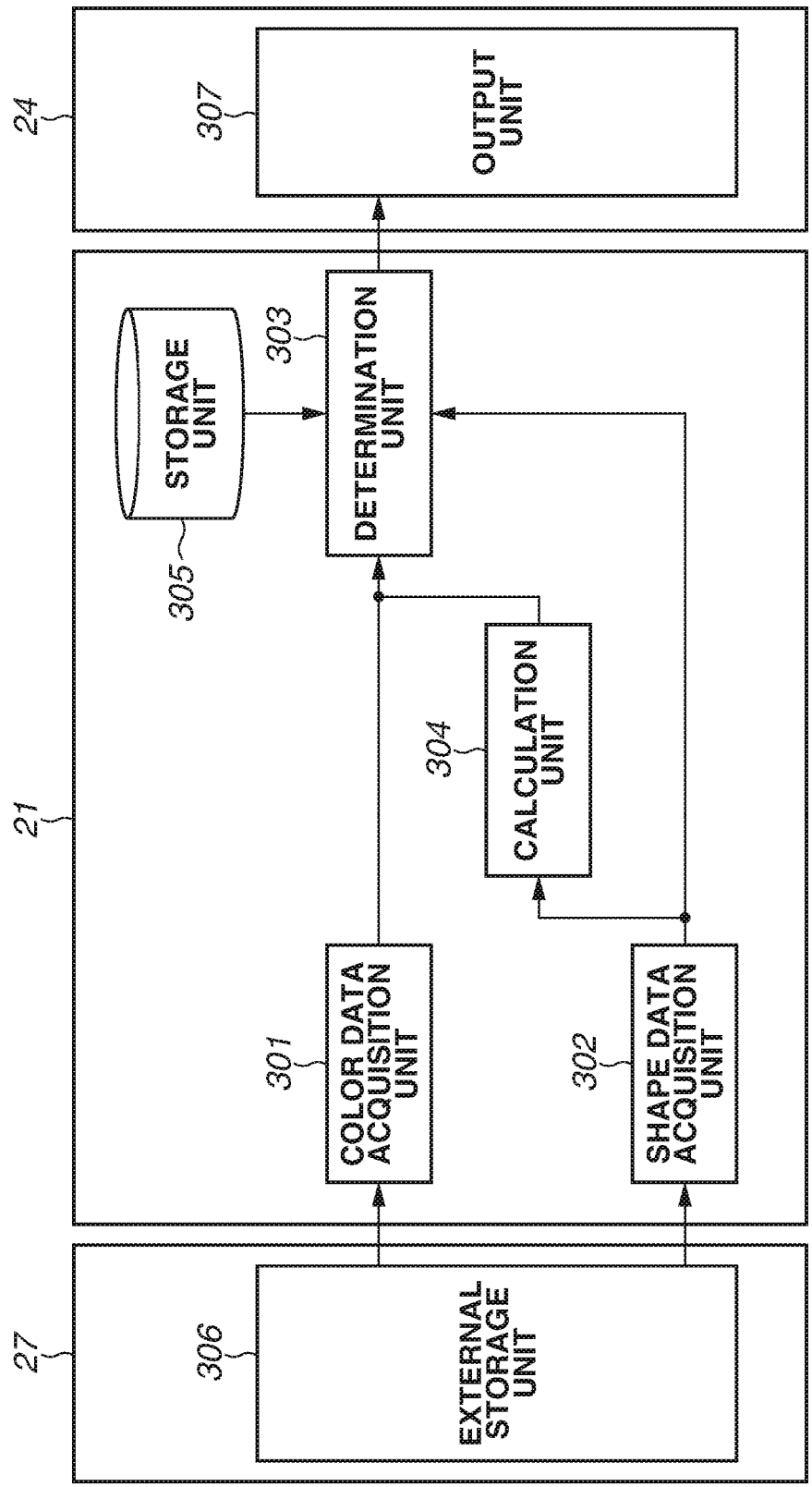
FIG. 3 is a block diagram illustrating a functional configuration of the image processing system.

FIG. 3 is a block diagram illustrating the functional configuration of the image processing system according to the present exemplary embodiment. In the image processing system, the image processing apparatus 21 includes a color data acquisition unit 301, a shape data acquisition unit 302, a determination unit 303, a calculation unit 304, and a storage unit 305. The HDD 27 includes an external storage unit 306, and the printer 24 includes an output unit 307.

The color data acquisition unit 301 acquires color data representing a color of a reproduction target object for each position thereon from the external storage unit 306. The shape data acquisition unit 302 acquires shape data representing a shape of the reproduction target object for each position thereon from the external storage unit 306. The calculation unit 304 performs frequency analysis on the shape data acquired by the shape data acquisition unit 302 to calculate the shape characteristics for the reproduction target object. The determination unit 303 acquires recording amount data concerning the color of the ink and the shape characteristics of the uneven layer stored in the storage unit 305 based on the color data acquired by the color data acquisition unit 301 and the shape characteristics calculated by the calculation unit 304. Then, the determination unit 303 determines the recording amount of colored ink and the recording amount of ink for forming an uneven layer and outputs recording amount data indicating respective recording amounts to the output unit 307.

<Processing Performed by Image Processing Apparatus 21>

Figure 4:
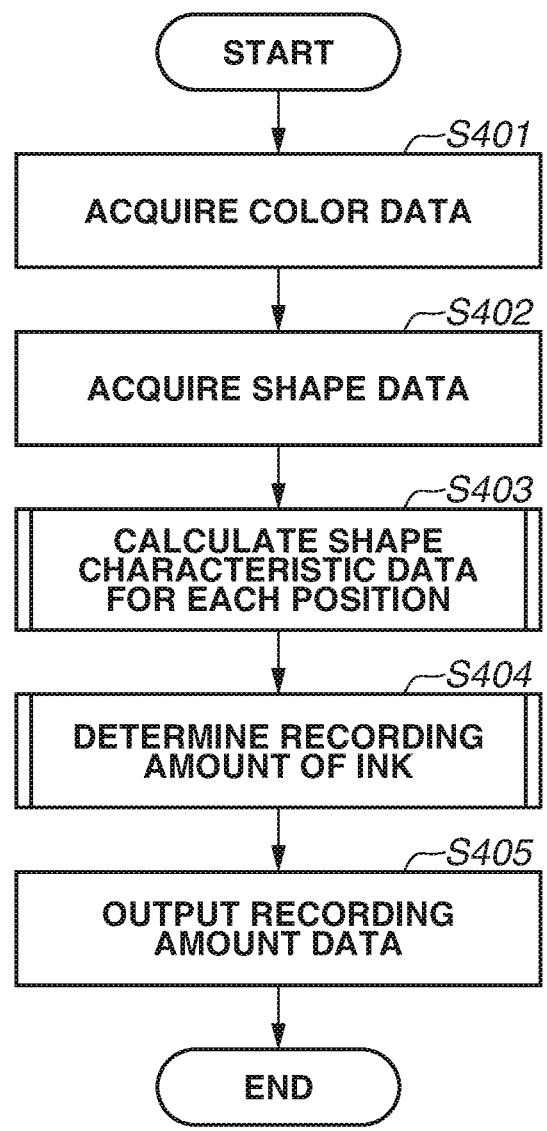
FIG. 4 is a flowchart illustrating processing performed by an image processing apparatus.

Processing performed in the present exemplary embodiment will be described below with reference to the flowchart illustrated in FIG. 4. As described above, the processing illustrated in FIG. 4 is implemented by the CPU 201 executing a program stored in the ROM 202 and the HDD 27 using the RAM 203 as a work memory.

In step S401, the color data acquisition unit 301 acquires color data representing the color of the reproduction target object for each position on the reproduction target object from the external storage unit 306. The color data represents a pixel group in which each pixel has red, green, and blue (RGB) values calculated based on the CIE $L^*a^*b^*$ (CIELAB) values by the sRGB conversion formula. An image represented by the color data is also referred to as a color image. Although the pixel values of each pixel of the color data according to the present exemplary embodiment are the RGB values defined in the sRGB space, the pixel values may be reproduced in other formats such as the RGB values defined in the AdobeRGB space, the $L^*a^*b^*$ values defined in the $L^*a^*b^*$ space, the XYZ values (tristimulus values of color), and spectrum reflectance.

In step S402, the shape data acquisition unit 302 acquires the shape data representing the shape of the reproduction target object for each position thereon from the external storage unit 306. The shape data represents the unevenness of the surface of the reproduction target object, and describes the two-dimensional distribution of information indicating the height with respect to the reference surface. The sizes of the shape data in the main and the sub scanning directions are assumed to be the same as the sizes of the color data. According to the present exemplary embodiment, the shape data represents a gray scale image with which the height at each position is converted into an 8-bit pixel value. An image represented by the shape data is also referred to as a shape image. As long as the shape characteristics can be calculated in step S403 (described below), the shape data may have the depth as a pixel value and may be reproduced in other formats such as mesh data and point group data.

In step S403, based on the shape data acquired in step S402, the calculation unit 304 calculates shape characteristic data representing the shape characteristics (for example, frequency) of the shape image for respective coordinate values. The processing in step S403 will be described in detail below.

In step S404, the determination unit 303 acquires the shape characteristic data calculated in step S403 and the recording amount data concerning the colored ink and the shape characteristics of the uneven layer stored in the storage unit 305, and determines the recording amount of colored ink and the recording amount of ink for forming an uneven layer. The processing in step S404 will be described in detail below.

In step S405, the image processing apparatus 21 outputs the recording amount data representing the recording amount of ink determined in step S404 to the output unit 307.

<Detailed Processing in Step S403>

The processing for calculating the shape characteristics in step S403 will be described below with reference to the flowchart illustrated in FIG. 5. As described at the beginning, the color gamut of a shape containing many high-frequency components provides a lower covering rate of the color material and therefore has a tendency of becoming smaller in volume than the color gamut of a shape containing many low-frequency components. In step S403, the calculation unit 304 calculates the frequency characteristics of the shape image for each coordinate value of the shape image to cope with a change in the color gamut corresponding to the shape. In a shape containing both many high-frequency components and many low-frequency components, the color gamut to be reproduced depends on the amplitude amount of higher frequency components. More specifically, as described in FIGS. 1A, 1B, and 1C, a shape including the shape containing low-frequency components illustrated in FIG. 1B and the shape containing high-frequency components illustrated in FIG. 1C will reproduce the color gamut corresponding to the shape containing high-frequency components drawn by solid lines illustrated in FIG. 1A. Therefore, the color gamut corresponding to a case of a shape containing both many high-frequency components and many low-frequency components can be regarded as a color gamut equivalent to a shape containing only high-frequency components. Therefore, if amplitudes of higher frequencies can be grasped out of frequency components representing a shape, it is possible to predict a color gamut corresponding to the shape. In step S403, the calculation unit 304 performs processing from high-frequency components to calculate frequency components for each coordinate value.

Figure 6A:
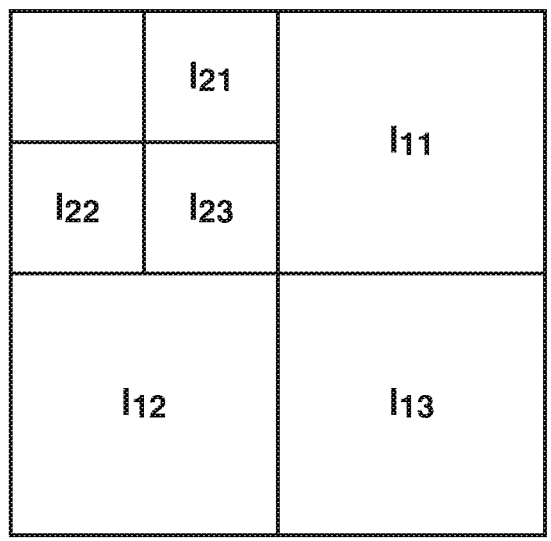
FIGS. 6A and 6B illustrate examples of results of wavelet transform.

In step S501, the calculation unit 304 performs frequency decomposition on a shape image represented by the shape data acquired in step S402. According to the present exemplary embodiment, the calculation unit 304 performs the known discrete wavelet transform which enables frequency decomposition while retaining phase information as an example of frequency decomposition. FIG. 6A illustrates the result of the discrete wavelet transform of level 2 performed in step S501. In the discrete wavelet transform of the level 2, as illustrated in FIG. 6A, the shape image is decomposed into high-frequency components I1 and low-frequency components I2. The high-frequency components I1 include high-frequency components $I_{11}$, $I_{12}$, and $I_{13}$, and the low-frequency components I2 include low-frequency components $I_{21}$, $I_{22}$, and $I_{23}$ according to the waveform directions. For example, the high-frequency component $I_{11}$ indicates a high-frequency component signal in the main scanning direction (lateral direction in FIG. 6A) and a low-frequency component signal in the sub scanning direction (longitudinal direction in FIG. 6A) of the shape image. The high-frequency component $I_{12}$ indicates a low-frequency component signal in the main scanning direction (lateral direction in FIG. 6A) and a high-frequency component signal in the sub scanning direction (longitudinal direction in FIG. 6A) of the shape image. The high-frequency component $I_{13}$ indicates a high-frequency component signal in the main scanning direction (lateral direction in FIG. 6A) and a high-frequency component signal of the sub scanning direction (longitudinal direction in FIG. 6A) of the shape image. Thus, the high-frequency components I1 include the high-frequency components $I_{11}$, $I_{12}$, and $I_{13}$ according to the waveform directions (longitudinal direction, lateral direction, and oblique direction). The high-frequency components $I_{11}$, $I_{12}$, and $I_{13}$ represent the intensity (more specifically, the amplitude value) of the frequency components at respective phase positions of the corresponding frequency. The phase positions of the high-frequency components correspond to the pixel positions of the shape image. The also applies to the low-frequency components $I_{21}$, $I_{22}$, and $I_{23}$.

Figure 6B:
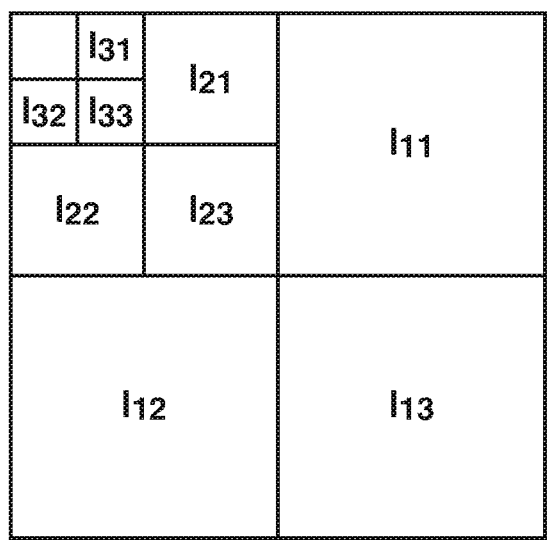

The high-frequency components $I_{11}$, $I_{12}$, and $I_{13}$ have a half resolution of the original image, i.e., a 2×2 pixel area corresponds to one pixel of the original image. The low-frequency components $I_{21}$, $I_{22}$, and $I_{23}$ have a quarter resolution of the original image, i.e., a 4×4 pixel area corresponds to one pixel of the original image. Although, in the present exemplary embodiment, the discrete wavelet of level 2 is used for the sake of description, the level of the discrete wavelet may be 3 or higher. In this case, however, the frequency is decomposed into 1-level lower frequency components $I_{31}$, $I_{32}$ and $I_{33}$, as illustrated in FIG. 6B. Thus, the discrete wavelet transform makes it possible to decompose the frequency into vertical, horizontal, and oblique components at intervals of a power of two.

In step S502, the calculation unit 304 sets a variable m to the initial value 1. Subsequent processing is repeatedly performed for each frequency from the highest-frequency component downward to the lowest-frequency component. The variable m indicates the number of repetitions. As described above, when the shape characteristics (frequency and amplitude) are calculated for a high-frequency component, it is necessary to set the shape characteristics to the corresponding coordinate position of the shape image without performing calculations for low-frequency components. Therefore, according to the present exemplary embodiment, processing is performed from high-frequency components to low-frequency components.

In step S503, the calculation unit 304 acquires frequency components Im after wavelet transform. For example, in the case of m=1, the calculation unit 304 acquires the frequency components $I_{11}$, $I_{12}$, and $I_{13}$ having the highest frequency in step S503.

In step S504, the calculation unit 304 acquires an amplitude $Amk(i,j)$ in the waveform direction k in the phase (i,j) of the frequency components after the wavelet transform acquired in step S503 from the frequency components after the wavelet transform acquired in step S503. For example, the amplitude $A_{11}(i,j)$ indicates the intensity of the signal value at the phase position (i,j) for the frequency component $I_{11}$.

In step S505, the calculation unit 304 calculates the maximum value $A(i,j)$ of the amplitude acquired in step S504 by using the formula 1.

[Formula 1]

$$A(i,j)=\max\{A_{m1}(i,j),A_{m2}(i,j),A_{m3}(i,j)\} \quad \text{(Formula 1)}$$

In step S506, the calculation unit 304 determines relations between the maximum value $A(i,j)$ of the amplitude in the phase (i,j) calculated in step S505 and threshold values $Th_{41}$ and $Th_{42}$ by using the formulas 2 and 3. Then, the calculation unit 304 determines the amplitude level in the phase (i,j) at a frequency F corresponding to the frequency component. When the formula 2 or 3 is satisfied (YES in step S506), the processing proceeds to step S507. On the other hand, when neither the formula 2 nor 3 is satisfied (NO in step S506), the processing proceeds to step S510.

[Formula 2]

$$A(i,j) \geq Th_{41} \quad \text{(Formula 2)}$$

[Formula 3]

$$Th_{42} \leq A(i,j) \leq Th_{44} \quad \text{(Formula 3)}$$

In step S507, the calculation unit 304 determines whether the processing target phase (i,j) is a phase without the frequency and amplitude settings. When the phase (i,j) is a phase without the frequency and amplitude settings (YES in step S507), the processing proceeds to step S508. On the other hand, when the phase (i,j) is not a phase without the frequency and amplitude settings (NO in step S507), the processing proceeds to step S510.

In step S508, the calculation unit 304 sets the amplitude level of coordinates ($2^m i$, $2^m j$), ($2^m i+1$, $2^m j$), ..., ($2^m i+2^m-1$, $2^m j+2^m-1$) of the shape image acquired in step S402. In step S508, the calculation unit 304 sets an amplitude level A1 when the formula 2 is satisfied or sets an amplitude level A2 when the formula 3 is satisfied. As described above, the frequency component after wavelet transform is lower than the resolution of the original image. The processing in step S508 is performed to identify the phase (coordinate position) of the original image corresponding to the phase of the frequency components after wavelet transform. The coordinates ($2^m i$, $2^m j$), ($2^m i+1$, $2^m j$), ..., ($2^m i+2^m-1$, $2^m j+2^m-1$) set in step S508 correspond to the phase (i,j) of the frequency components after wavelet transform.

In step S509, the calculation unit 304 sets the frequency of coordinates ($2^m i$, $2^m j$), ($2^m i+1$, $2^m j$), ..., ($2^m i+2^m-1$, $2^m j+2^m-1$) of the original image to the frequency F obtained as a result of the discrete wavelet transform. More specifically, the calculation unit 304 sets the frequency to the frequency F corresponding to the frequency components acquired in step S503.

In step S510, the calculation unit 304 determines whether processing is completed for all of the phases (i,j) of the frequency components acquired in step S503. When processing is completed for all of the phases (i,j) (YES in step S510), the processing proceeds to step S512. On the other hand, when processing is completed not for all of the phases (i,j) (NO in step S510), the processing proceeds to step S511.

In step S511, the calculation unit 304 updates the values of phase information (i,j), and the processing returns to step S503.

In step S512, the calculation unit 304 determines whether processing is completed for all of the frequency components after wavelet transform. When processing is completed not for all of the frequency components (NO in step S512), the processing proceeds to step S513. On the other hand, when processing is completed for all of the frequency components (YES in step S512), the processing proceeds to step S514.

In step S513, the calculation unit 304 increments the variable m that indicates the number of repetitions by one, and the processing returns to step S503.

In step S514, the calculation unit 304 sets the frequency of the phase without the frequency setting to 0, and the processing exits this flowchart. An area without the frequency setting means a flat area without unevenness. According to the present exemplary embodiment, the frequency is set to 0 for such a flat area.

<Detailed Processing in Step S404>

Figure 7:
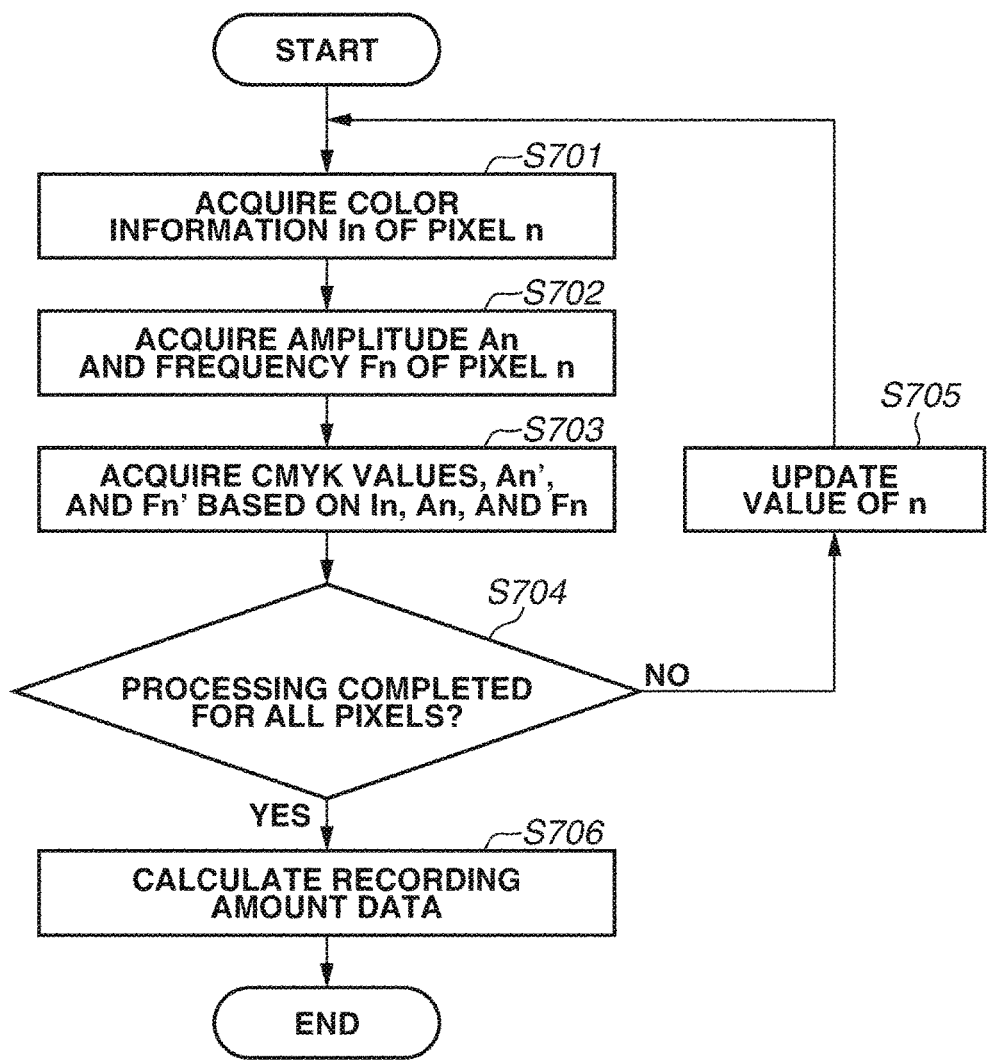
FIG. 7 is a flowchart illustrating processing for calculating recording amount data.

Step S404 performed by the determination unit 303 will be described below with reference to FIG. 7. According to the present exemplary embodiment, it is assumed that target L*a*b* values, the recording amount data of cyan, magenta, yellow, and block (CMYK) colored ink corresponding to the shape characteristics, and the shape characteristic data of the uneven layer are prestored as a lookup table (LUT). Although, in the present exemplary embodiment, colored ink of four different colors, C (cyan) ink, M (magenta) ink, Y (yellow) ink, and K (black) ink, is used for image formation, colored ink is not limited thereto. Light cyan ink having close hue to C ink and lower density than C ink, and light magenta ink having close hue to M ink and lower density than M ink may be used. Although the recording material for forming an uneven layer according to the present exemplary embodiment is ultraviolet (UV) curable ink cured by being irradiated with ultraviolet light (UV), the recording material is not limited thereto. For example, the recording material may be ink cured by light other than UV or ink cured by heat. An unevenness may be formed by using colorless resin ink such as white or invisible ink. An unevenness may also be formed by trimming the uneven layer or by using wood or a metal other than resin.

In step S701, the determination unit 303 acquires color information In of a pixel n in the color data acquired by the color data acquisition unit 301 and converts the color information In into L*a*b* values as reproduction target color information. The color data according to the present exemplary embodiment is reproduction target color information of a subject and is assumed to be RGB values captured by an imaging device such as a camera and scanner. The conversion from RGB values into L*a*b* values can be performed by using a sRGB conversion formula if the imaging device conforms to the sRGB color. If color conversion specific to the imaging device is required, it is necessary to capture a plurality of patches, acquire an association between captured RGB and colorimetric L*a*b* values, and convert RGB values into L*a*b* values through the following calculation.

[Formula 4]

$$I' = ((I+\alpha)/\beta)^\gamma \quad \text{(Formula 4)}$$

[Formula 5]

$$\begin{pmatrix} X \\ Y \\ Z \end{pmatrix} = \begin{pmatrix} a11 & a12 & a13 \\ a21 & a22 & a23 \\ a31 & a32 & a33 \end{pmatrix} \begin{pmatrix} R' \\ G' \\ B' \end{pmatrix} \quad \text{(Formula 5)}$$

Referring to the formula 4, I indicates RGB pixel values normalized between 0 and 1. $\alpha$, $\beta$, and $\gamma$ in the formula 4 and the coefficients in the matrix in the formula 5 are values specific to the imaging device. Therefore, the coefficients can be determined by capturing a plurality of patches and acquiring the association between RGB and colorimetric L*a*b* values. The L*a*b* values can be acquired by converting the calculated XYZ values into L*a*b* values based on a predetermined CIE formula.

In step S702, the determination unit 303 acquires the amplitude An and the frequency Fn at the pixel n of the shape characteristic data calculated by the calculation unit 304.

In step S703, based on the reproduction target color information L*a*b* values, the amplitude An, and the frequency Fn, the determination unit 303 calculates the surface shape (amplitude An' and frequency Fn') of the uneven layer and the CMYK ink amount values for forming a color material layer. For this calculation, the determination unit 303 uses an LUT stored in the storage unit 305. The LUT stored in the storage unit 305 will be described below with reference to FIG. 8. FIG. 8 illustrates an LUT corresponding to the reproduction target shape characteristics (amplitude A1 and frequency F1). A plurality of LUTs will be stored for other shape characteristics. Each LUT describes an association between the surface shape characteristics (amplitude A' and frequency F') of the uneven layer and the CMYK ink amounts according to the reproduction target L*a*b* values. In the method for acquiring data after LUT-based conversion, an LUT corresponding to the reproduction target surface shape characteristics (amplitude A1 and frequency F1) is selected. Then, the surface shape characteristics (amplitude An' and frequency Fn') of the uneven layer and the CMYK colored ink amounts corresponding to L=Ln, a=an, and b=bn as reproduction target L*a*b* values are acquired. However, an LUT is not limited thereto. For example, the recording amount of ink for forming an uneven layer may be described instead of the surface shape characteristics of the uneven layer. A method for generating an LUT will be described below.

In step S704, the determination unit 303 determines whether processing is completed for all pixels. When processing is completed for all pixels (YES in step S704), the processing proceeds to step S706. On the other hand, when processing is completed not for all pixels (NO in step S704), the processing proceeds to step S705. In step S705, the determination unit 303 updates the value of n, and the processing returns to step S701.

In step S706, the determination unit 303 calculates the recording amount data of UV curable ink for forming an uneven layer based on the amplitude An' and frequency Fn', and transmits the recording amount data of colored ink and UV curable ink to the output unit 307. To calculate the recording amount data of UV curable ink, the determination unit 303 first performs inverse wavelet transform on the shape characteristic data to convert it into shape data having height information for each pixel, and then converts the height information into the recording amount data of UV curable ink. The conversion from the height information into the recording amount data of UV curable ink is not illustrated. The determination unit 303 needs to perform the above-described conversion by using an LUT for associating the height with the recording amount of ink. The shape characteristics may be directly converted into the recording amount of UV curable ink by using an LUT for associating the shape characteristics (for example, the amplitude and frequency) with the recording amount of UV curable ink, without performing the conversion from the shape characteristics into the height information.

After generating dot arrangement data representing the dot arrangement of ink through known halftone processing and path decomposition by using the recording amount data, the dot arrangement data may be output. This LUT is provided for each type of the material for forming an uneven layer. When the user changes the material of the uneven layer, the LUT to be referred to will be changed.

Although, in the present exemplary embodiment, the shape characteristics were converted through the wavelet transform, the technique for frequency decomposition is not limited thereto. For example, it is also possible to perform the known Fourier transform for each area or to decompose image data by using a high-pass filter and low-pass filter and use the components. The shape data may be decomposed into concave and convex portions with reference to the average height, and the concave and convex portions may be separately processed.

Although, in the present exemplary embodiment, the amplitude and frequency were used as the shape characteristic data, the shape characteristic data is not limited thereto. For example, the change rate or standard deviation of height for each unit pixel may be used, or the change rate or standard deviation of the normal line for each unit pixel may be used. Further, the surface roughness (arithmetic average roughness, maximum height, and weighted average roughness) defined by Japanese Industrial Standards (JIS) may be used.

Although, in the present exemplary embodiment, frequency decomposition was performed on the shape data to calculate the shape characteristic data, the processing is not limited to the above-described example. For example, it is also possible to prestore the shape characteristic data in the external storage unit 306, acquire the stored shape characteristic data, and use the data for subsequent processing.

<Method for Generating LUT Stored in Storage Unit 305>

Figure 9:
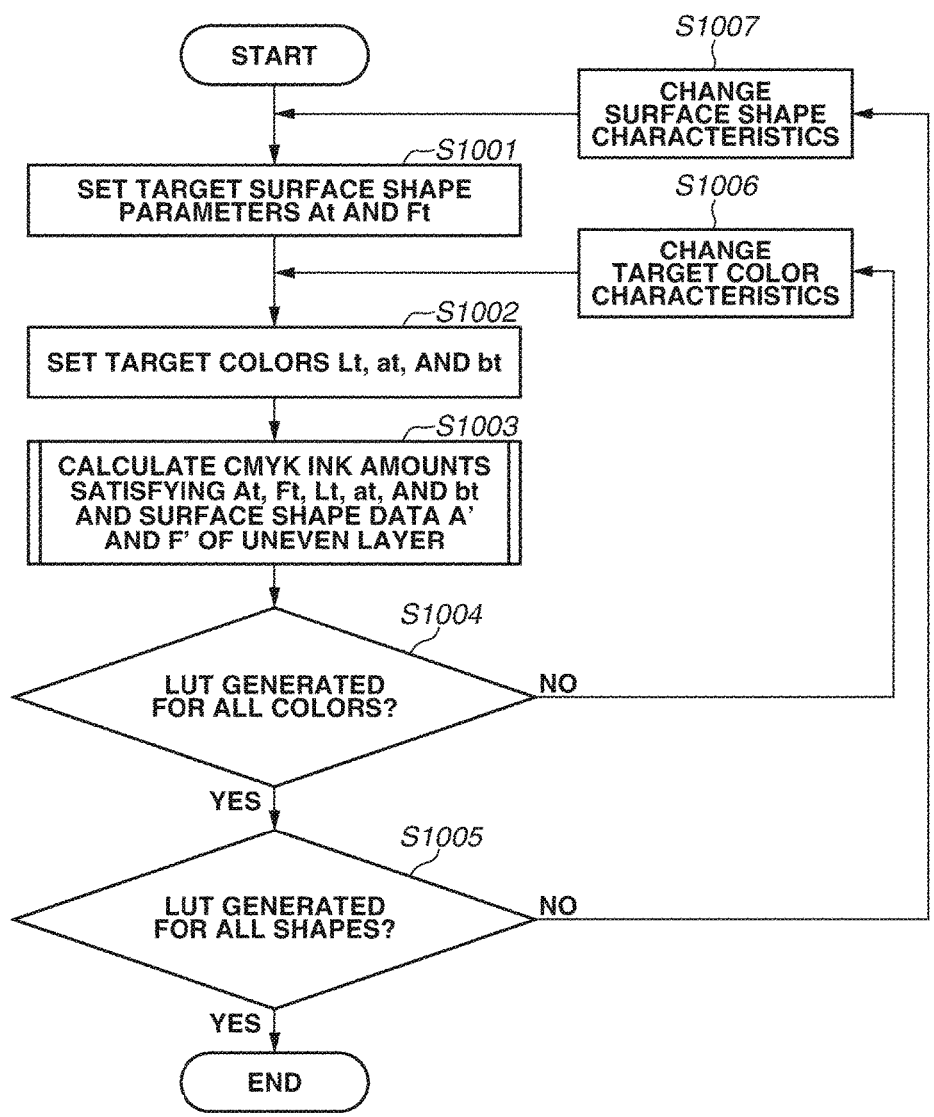
FIG. 9 is a flowchart illustrating a method for generating an LUT.

Subsequently, a method for generating an LUT stored in the storage unit 305 will be described below. FIG. 9 is a flowchart illustrating a method for generating an LUT stored in the storage unit 305. When generating an LUT, the CPU 201 measures color and shape on a printing sample including a plurality of types of patches preformed while changing the surface shape characteristics (amplitude and frequency) and the colored ink amount. Based on the measurement result, the CPU 201 preacquires the association between the color (L*a*b*) and the shape characteristics (amplitude and frequency) when the uneven layer and color material layer are combined for the CMYK ink amounts and the shape characteristics (amplitude and frequency) of the uneven layer.

In step S1001, the CPU 201 first sets the surface shape characteristics (At and Ft) as input values (reproduction target values) of the LUT. In step S1002, the CPU 201 sets the color characteristics Lt, at, and bt as input values of the LUT. In step S1003, based on the result of the above-described measurement, the CPU 201 calculates the CMYK ink amounts and the surface shape (amplitude A' and frequency F') of the uneven layer as target values (At, Ft, Lt, at, and bt). This processing will be described in detail below.

In step S1004, the CPU 201 determines whether an LUT has been generated for all colors. When an LUT has been generated not for all pixels (NO in step S1004), the processing proceeds to step S1006. In step S1006, the CPU 201 changes the target color characteristics, and the processing returns to step S1002. On the other hand, when an LUT has been generated for all pixels (YES in step S1004), the processing proceeds to step S1005. In step S1005, the CPU 201 determines whether an LUT has been generated for all shapes. When an LUT has been generated not for all shapes (NO in step S1005), the processing proceeds to step S1007. In step S1007, the CPU 201 changes the target surface shape characteristics, and the processing returns to step S1001.

<Method for Calculating Colored Ink Amounts and Surface Shape Data of Uneven Layer in Step S1003>

When performing the processing in step S1003, the CPU 201 generates a color evaluation function Col and a shape evaluation function Sh, based on measurement data.

<Color Evaluation Function Col>

The color evaluation function Col will be described below.

[Formula 6]

$$[L^*a^*b^*] = \mathrm{Col}(C, M, Y, K, A', F') \qquad \text{(Formula 6)}$$

The color evaluation function Col represented by the formula 6 is a function of calculating the color information (L*a*b*) when the uneven layer and color material layer are combined based on the recording amount data (CMYK recording amounts) and the shape characteristic data (amplitude A' and frequency F') of the uneven layer.

The function Col will be described below. Colormetric data (reflectance data) representing colormetric values (reflectance) corresponding to known CMYK ink amounts is prestored as an LUT for each piece of shape data (amplitude A and frequency F) of the uneven layer. By using the LUT, reflectance data Rc, Rm, Ry, and Rk of respective ink is obtained according to the formula 7.

[Formula 7]

$$Rc=LUT\_Col\_c(C,A',F')$$

$$Rm=LUT\_Col\_m(M,A',F')$$

$$Ry=LUT\_Col\_y(Y,A',F')$$

$$Rk=LUT\_Col\_k(K,A',F') \quad \text{(Formula 7)}$$

The RGB values are converted into XYZ values through a 3×4 matrix calculation represented by the formula 8. The matrix coefficients are obtained through optimization based on the measurement data.

[Formula 8]

$$\begin{pmatrix} X \\ Y \\ Z \end{pmatrix} = \begin{pmatrix} a11 & a12 & a13 & a14 \\ a21 & a22 & a23 & a24 \\ a31 & a32 & a33 & a34 \end{pmatrix} \begin{pmatrix} R' \\ G' \\ B' \end{pmatrix} \quad \text{(Formula 8)}$$

Based on a predetermined CIE formula, the calculated XYZ values are converted into L*a*b* values. However, the calculation of the color evaluation function is not limited thereto and may be, for example, a polynomial calculation instead of the matrix calculation.

<Shape Evaluation Function Sh>

The shape evaluation function Sh will be described below.

[Formula 9]

$$[A,F]=Sh(C,M,Y,K,A',F') \quad \text{(Formula 9)}$$

The shape evaluation function Sh represented by the formula 9 is a function of calculating the shape characteristics A and F when the uneven layer and color material layer is combined based on the recording amount data (CMYK recording amounts) and the shape characteristic data (amplitude A' and frequency F') of the uneven layer.

The function Sh will be described below. The shape characteristic data corresponding to known CMYK ink amounts is prestored as an LUT for each piece of the shape data (amplitude A and frequency F) of the uneven layer, and then converted into shape data for respective ink according to the formula 10.

[Formula 10]

$$[Ac,Fc]=LUT\_Col\_c(C,A',F')$$

$$[Am,Fm]=LUT\_Col\_m(M,A',F')$$

$$[Ay,Fy]=LUT\_Col\_y(Y,A',F')$$

$$[Ak,Fk]=LUT\_Col\_k(K,A',F') \quad \text{(Formula 10)}$$

Then, by using the formula 11, the shape data of respective ink is converted into height data through the inverse Fourier transform, and the four pieces of the height data are added.

[Formula 11]

$$Depth=IFFT(Ac,Fc)+IFFT(Am,Fm)+IFFT(Ay,Fy)+IFFT(Ak,Fk) \quad \text{(Formula 11)}$$

Depth denotes height. Finally, wavelet transform is performed on the height data after addition to obtain the shape characteristics A and F.

Figure 10:
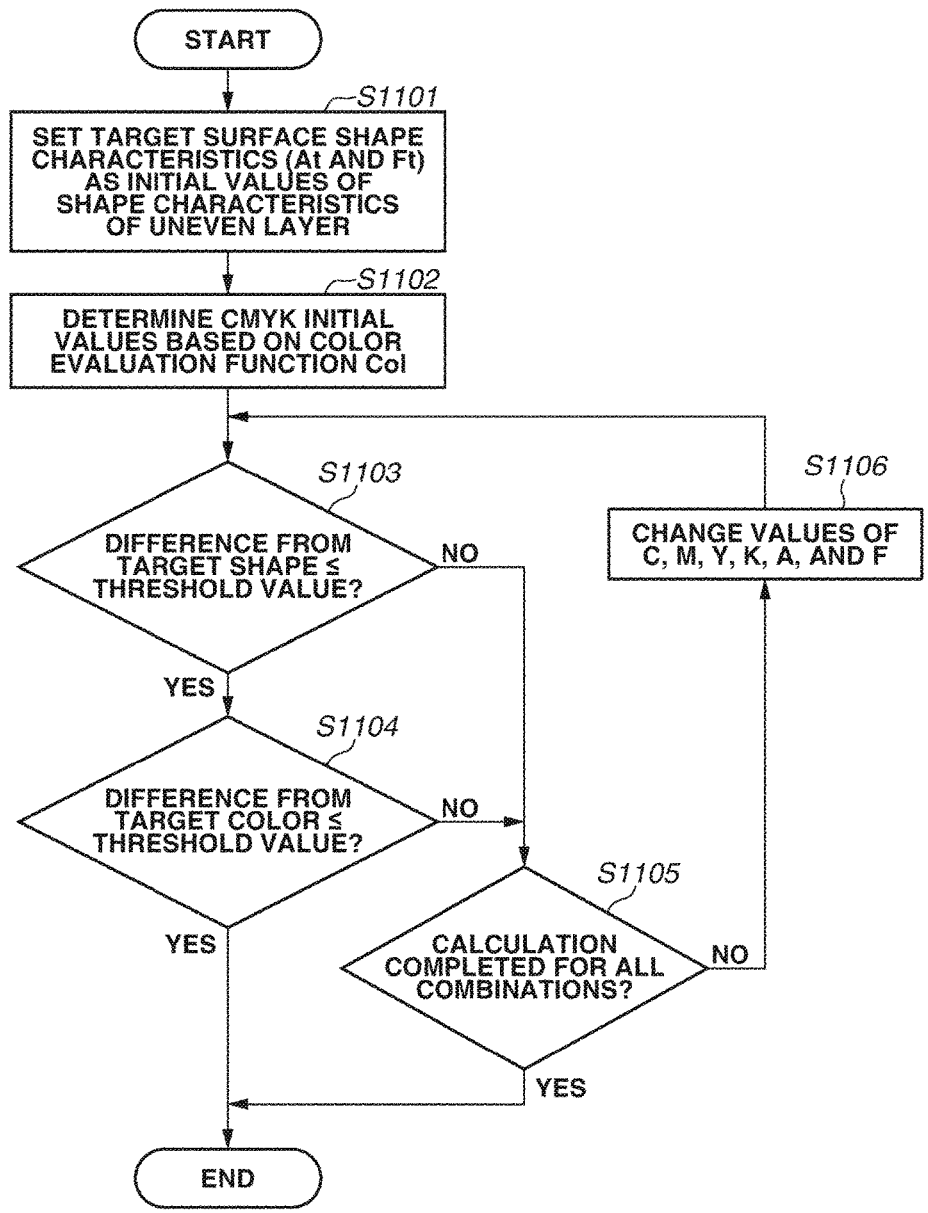
FIG. 10 is a flowchart illustrating processing for calculating an ink amount and a surface shape when generating an LUT.

The operation in step S1003 will be described below with reference to FIG. 10. In step S1101, the CPU 201 first sets the target shape characteristics At and Ft as initial values of the shape characteristics of the uneven layer. In step S1102, the CPU 201 performs the inverse conversion of the color evaluation function Col to determine the CMYK values corresponding to the target colors Lt, at, and bt, and the target shape characteristics At and Ft. In step S1103, the CPU 201 calculates the difference between predicted values of the shape characteristics A and F calculated by the shape evaluation function Sh and the target shape characteristics. When the difference between the predicted values and the target shape characteristics is equal to or less than a predetermined threshold value (YES in step S1103), the processing proceeds to step S1104. On the other hand, when the difference exceeds the predetermined threshold value (NO in step S1103), the processing proceeds to step S1105. The threshold value for the difference in the shape characteristics can be set by using vernier acuity (about 10 s) as the minimum eyesight for recognizing concave and convex portions. When the visual distance is 300 mm, 14 μm is calculated by the formula 12. Therefore, it is necessary to prestore the association between pixel values and the height of the shape actually formed on a recording medium according to the pixel values, and use the value corresponding to 14 μm as the threshold value. According to the present exemplary embodiment, since the difference in the shape characteristics is calculated, the threshold value of the height is converted into the shape characteristic value by using the above-described method.

[Formula 12]

$$300 \text{ mm} \times \tan(10 \text{ s}) = 14 \text{ μm} \quad \text{(Formula 12)}$$

The usual eyesight 1.0 (60 s) may be used. In this case, when the visual distance is 300 mm, 0.1 mm is obtained by the formula 13. Therefore, the value corresponding to 0.1 mm is used as a threshold value.

[Formula 13]

$$300 \text{ mm} \times \tan(60 \text{ s}) = 0.1 \text{ mm} \quad \text{(Formula 13)}$$

The threshold value can also be set based on the discharging capacity of UV curable ink. For example, when the minimum discharge resolution of a printer is 1 mm, it is necessary to use the value corresponding to 1 mm as the threshold value.

In step S1104, the CPU 201 calculates the difference (color difference ΔE) between the predicted values of the L*a*b* values calculated by the color evaluation function Col and the target colors. When the color difference ΔE is equal to or less than a predetermined threshold value (YES in step S1104), the processing exits the flowchart. On the other hand, when the color difference ΔE exceeds the predetermined threshold value (NO in step S1104), the processing proceeds to step S1105. The threshold value for the color difference ΔE is set based on the allowable color differences defined by the Color Science Association of Japan. For example, to achieve a level at which a color difference is felt through closer comparison, the threshold value LE is set to 0.8 to 1.6. To achieve a level at which a color difference is hardly noticed through separated comparison, the threshold value ΔE is set to 1.6 to 3.2. To achieve a level at which the handling as the same color on an impression basis is possible, the threshold value ΔE is set to 3.2 to 6.5. ΔE represents the distance between two points in the L*a*b* color space. The method for setting a threshold value is not limited to the above-described example. The threshold value may be set by using a known allowable color difference, and may be set to a low value such as 1 or 2.

In step S1105, the CPU 201 determines whether calculation is completed for all combinations of CMYK, A, and F. When calculation is completed for all combinations of CMYK, A, and F (YES in step S1105), no solution exists. In this case, the CPU 201 sets the value of the LUT to an empty value (or 0), and the processing exits this flowchart. When calculation is completed not for all combinations (NO in step S1105), the processing proceeds to step S1106. In step S1106, the CPU 201 changes the values of CMYK, A, and F, and the processing returns to step S1103.

According to the present exemplary embodiment, it is possible to achieve both the color reproduction and the unevenness reproduction by storing information applicable to printer output corresponding to the reproduction target shape and color.

Although, in the present exemplary embodiment, an LUT was generated so that the difference between the predicted value of the shape characteristics A and F calculated by the shape evaluation function Sh and the target shape, and the difference between the predicted values of the L*a*b values calculated by the color evaluation function Col and the target color become equal to or less than respective predetermined threshold values, the processing is not limited thereto. For example, it is also possible to perform optimization so that the above-described difference in the shape characteristics and the difference in color are minimized to determine the shape characteristics of the uneven layer and the recording amounts of colored ink. More specifically, the shape characteristics of the uneven layer and the recording amounts of colored ink with which the (weighted) average of the difference in the shape characteristics and the difference in color is minimized are stored in the LUT.

Although, in the present exemplary embodiment, the LUT data was generated by using two different (color and shape) evaluation functions, the processing is not limited thereto. For example, it is also possible to search for data close to the reproduction target color and shape characteristics A and F from a plurality of pieces of measurement data, and calculate CMYK values and shape characteristics for each piece of a plurality of measurement data through interpolation processing.

Since a deviation may arise in the values to be stored in the LUT according to the measurement data, the values may be stored at equal intervals by using interpolation processing.

The present exemplary embodiment has been described above on the premise that the resolution of the color image and the resolution of the shape image are identical. However, the resolutions do not necessarily need to be identical. In that case, it is necessary to perform the resolution conversions on the color image or shape image by using a known resolution conversion technique to perform processing for adjusting the two resolutions.

According to the present exemplary embodiment, the shape data was handled as a two-dimensional distribution of height on a reference surface. However, the shape data is not limited thereto as long as the shape data is equivalent to the two-dimensional distribution of height. For example, the shape data may be a two-dimensional distribution of a normal line vector. In this case, it is necessary to convert a normal line vector into height data by performing integration.

Although the present exemplary embodiment has been described above on the premise that the amplitude level is 2 for the sake of description, the amplitude level is not limited thereto. When the amplitude level is 3 or higher, threshold values corresponding to the amplitude level are provided and the determination in step S506 will be performed for the number of threshold values.

Although, in the present exemplary embodiment, the wavelet transform was used as a technique of frequency decomposition, the technique of frequency decomposition is not limited thereto. For example, the known Fourier transform may be performed for each area.

According to the present exemplary embodiment, in step S703, the surface shape (amplitude An' and frequency Fn') of the uneven layer and the CMYK ink amount values for forming a color material layer were calculated by using an LUT based on the reproduction target color information L*a*b* values, the amplitude An, and the frequency Fn. However, the processing is not limited to the above-described example. For example, instead of using an LUT, the storage unit 305 may store data of the above-described color evaluation function Col and the shape evaluation function Sh and use the stored data. Alternatively, measurement data of patches may be used instead of an LUT. In this case, as described above, it is also possible to search for data close to reproduction target color and shape characteristics A and F from a plurality of pieces of measurement data, and calculate CMYK values and shape characteristics for each piece of a plurality of the measurement data through interpolation processing.

According to various embodiments of the present disclosure, it is possible to achieve both the unevenness reproduction and the color reproduction on a recording medium.

OTHER EMBODIMENTS

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While exemplary embodiments have been described, it is to be understood that the present disclosure is not limited to the disclosed exemplary embodiments. The scope of the following claims is to be accorded the broadest interpretation so as to encompass all such modifications and equivalent structures and functions.

This application claims the benefit of Japanese Patent Applications No. 2016-169375, filed Aug. 31, 2016, and No. 2017-099068, filed May 18, 2017, which are hereby incorporated by reference herein in their entirety.

What is claimed is:

1. An image processing apparatus comprising:
    a first acquisition unit configured to acquire color data representing a color of the target object for each position on the target object;
    a second acquisition unit configured to acquire shape characteristic data representing characteristics of the shape of the target object for each position on the target object; and
    a determination unit configured to determine a first recording amount of a first recording material for forming a shape of a target object on a recording medium, and a second recording amount of a second recording material for recording a color of the target object on the shape formed on the recording medium,
    wherein the first recording amount and the second recording amount are determined based on the color data, the shape characteristic data, and any one of a measurement result, a function calculated based on the measurement result, and a table generated based on the function, and
    wherein the measurement result is obtained by measuring color and shape characteristics of a plurality of types of patches formed by recording the second recording material on the first recording material recorded on the recording medium.

2. The image processing apparatus according to claim 1, further comprising a third acquisition unit configured to acquire shape data representing the shape of the target object for each position thereon,
    wherein the second acquisition unit acquires, as the shape characteristic data, characteristics obtained by analyzing the shape data.

3. The image processing apparatus according to claim 2, wherein the second acquisition unit acquires, as the shape characteristic data, a frequency and an amplitude obtained by performing frequency decomposition on the shape data.

4. The image processing apparatus according to claim 2,
    wherein the third acquisition unit acquires the shape data representing a height from a reference surface of the target object for each position on the target object, and
    wherein the second acquisition unit acquires, as the shape characteristic data, a change rate of the height calculated based on the shape data or a standard deviation of the height.

5. The image processing apparatus according to claim 2,
    wherein the third acquisition unit acquires the shape data representing a normal line of the target object for each position on the target object, and
    wherein the second acquisition unit acquires, as the shape characteristic data, a change rate in the normal line calculated based on the shape data or a standard deviation of the normal line.

6. The image processing apparatus according to claim 1, wherein the second acquisition unit acquires the shape characteristic data representing a surface roughness of the target object for each position thereon.

7. The image processing apparatus according to claim 1, wherein the determination unit determines, based on the color data and the shape characteristic data, the first recording amount and the second recording amount so that a difference between characteristics of the shape formed on the recording medium with the first recording material based on the first recording amount and the characteristics represented by the shape characteristic data is equal to or less than a predetermined threshold value, and so that a difference between a color recorded on the shape with the second recording material based on the second recording amount and a color represented by the color data is equal to or less than a predetermined threshold value.

8. The image processing apparatus according to claim 1,
    wherein, by using the table in which the color represented by the color data and the characteristics represented by the shape characteristic data are associated with characteristics of the shape formed on the recording medium with the first recording material and the second recording amount, the determination unit acquires characteristics of the shape formed on the recording medium with the first recording material and the second recording amount, and
    wherein, based on the acquired characteristics of the shape formed on the recording medium with the first recording material and the second recording amount, the determination unit determines the first recording amount and the second recording amount.

9. The image processing apparatus according to claim 1, wherein, by using the table in which the color represented by the color data and the characteristics represented by the shape characteristic data are associated with the first recording amount and the second recording amount, the determination unit determines the first recording amount and the second recording amount.

10. The image processing apparatus according to claim 8, further comprising a generation unit configured to generate the table based on the function,
    wherein the determination unit determines the first recording amount and the second recording amount based on the table generated by the generation unit, the color data, and the shape characteristic data.

11. The image processing apparatus according to claim 1,
    wherein, by using a function for calculating characteristics of the shape formed on the recording medium with the first recording material and the second recording amount, based on the color represented by the color data and the characteristics represented by the shape characteristic data, the determination unit calculates the characteristics of the shape formed on the recording medium with the first recording material and the second recording amount, and
    wherein, based on the calculated characteristics of the shape formed on the recording medium with the first recording material and the second recording amount, the determination unit determines the first recording amount and the second recording amount.

12. The image processing apparatus according to claim 11, further comprising a calculation unit configured to calculate a function based on the measurement result,
    wherein, based on the function calculated by the calculation unit, the color data, and the shape characteristic data, the determination unit determines the first recording amount and the second recording amount.

13. The image processing apparatus according to claim 1,
wherein, based on colormetric values and the measurement result of the surface shape characteristics on the recording medium obtained by measuring the plurality of types of patches, the determination unit searches for the color represented by the color data and the characteristics represented by the shape characteristic data, and
wherein, based on a result of the search, the determination unit determines the first recording amount and the second recording amount.

14. The image processing apparatus according to claim 1, further comprising an output unit configured to, based on the first recording amount and the second recording amount, form the shape on the recording medium with the first recording material and record the second recording material on the shape formed on the recording medium.

15. The image processing apparatus according to claim 1, further comprising:
a generation unit configured to generate first dot arrangement data corresponding to a dot arrangement of the first recording material on the recording medium based on the first recording amount, and generate second dot arrangement data corresponding to a dot arrangement of the second recording material on the recording medium based on the second recording amount; and
an output unit configured to, based on the first dot arrangement data and the second dot arrangement data, form the shape on the recording medium with the first recording material and record the second recording material on the shape formed on the recording medium.

16. The image processing apparatus according to claim 1, wherein the first recording material is a recording material cured by light or heat, wood, or metal, and the second recording material is a colored recording material.

17. The image processing apparatus according to claim 16,
wherein the first recording material is ink cured by being irradiated with ultraviolet light, and
wherein the second recording material is colored ink.

18. An image processing method comprising:
acquiring, as a first acquisition, color data representing a color of the target object for each position on the target object;
acquiring, as a second acquisition, shape characteristic data representing characteristics of the shape of the target object for each position on the target object; and
determining a first recording amount of a first recording material for forming a shape of a target object on a recording medium, and a second recording amount of a second recording material for recording a color of the target object on the shape formed on the recording medium,
wherein the first recording amount and the second recording amount are based on the color data, the shape characteristic data, and any one of a measurement result, a function calculated based on the measurement result, and a table generated based on the function, and
wherein the measurement result is obtained by measuring color and shape characteristics of a plurality of types of patches formed by recording the second recording material on the first recording material recorded on the recording medium.

19. A non-transitory computer-readable storage medium storing instructions that, when executed by a computer, cause the computer to perform an image processing process, the image processing process comprising:
acquiring, as a first acquisition, color data representing a color of the target object for each position on the target object;
acquiring, as a second acquisition, shape characteristic data representing characteristics of the shape of the target object for each position on the target object; and
determining a first recording amount of a first recording material for forming a shape of a target object on a recording medium, and a second recording amount of a second recording material for recording a color of the target object on the shape formed on the recording medium,
wherein the first recording amount and the second recording amount are based on the color data, the shape characteristic data, and any one of a measurement result, a function calculated based on the measurement result, and a table generated based on the function, and
wherein the measurement result is obtained by measuring color and shape characteristics of a plurality of types of patches formed by recording the second recording material on the first recording material recorded on the recording medium.

* * * * *